United States Patent [19]

Abe

[11] 3,959,872

[45] June 1, 1976

[54] METHOD FOR PRODUCING A CORE FORM TO BE EMPLOYED IN THE MOLDING OF A BALL JOINT BEARING

[75] Inventor: Michio Abe, Kasugai, Japan

[73] Assignee: Tokai TRW & Co. Limited, Kasugai, Japan

[22] Filed: Apr. 28, 1975

[21] Appl. No.: 572,529

[30] Foreign Application Priority Data

May 1, 1974 Japan.............................. 49-49137

[52] U.S. Cl.............................. 29/527.4; 29/527.6; 29/424; 29/423; 29/149.5 B; 29/148.4 L; 308/72
[51] Int. Cl.² ........................................ B22D 11/126
[58] Field of Search ..... 29/527.4, 149.5 B, 148.4 L, 29/424, 527.6, 423 UX, 423 X

[56] References Cited
UNITED STATES PATENTS

| | | | |
|---|---|---|---|
| 2,636,849 | 4/1953 | Brenner | 29/423 X |
| 3,012,314 | 12/1961 | Otters | 29/423 |
| 3,654,683 | 11/1972 | White | 29/149.5 B |
| 3,840,977 | 10/1974 | Dimitracopoulos | 29/527.4 |

FOREIGN PATENTS OR APPLICATIONS
229,080 7/1960 Australia........................ 29/149.5 B

*Primary Examiner*—C. W. Lanham
*Assistant Examiner*—V. Rising
*Attorney, Agent, or Firm*—James E. Nilles

[57] ABSTRACT

A method for producing a core form to be employed in the injection molding of a ball joint bearing which has a spherical bearing surface adapted to encircle the ball of a ball joint resiliently and a plurality of isolated oil retention recesses formed in the bearing surface, comprising the steps of forming a spherical portion corresponding to said bearing surface of the bearing on a core form blank, applying a lead layer onto said spherical portion, removing said lead layer from selected areas of said spherical portion which correspond to said oil retention recesses in the bearing surface to expose the areas, applying a hard chrome plating layer at said exposed areas of the spherical portion to form reliefs which are adapted to form said oil retention recesses in the bearing and removing the remaining portion of said lead layer from the spherical portion.

5 Claims, 5 Drawing Figures

METHOD FOR PRODUCING A CORE FORM TO BE EMPLOYED IN THE MOLDING OF A BALL JOINT BEARING

BACKGROUND OF THE INVENTION

This invention relates to a method for producing a core form suitable to be employed for injection-molding a ball joint bearing to be used in a steering system of a vehicle.

A ball joint has been known which comprises a metal housing, a resilient synthetic resin or rubber bearing received within the housing and having a spherical bearing surface and a ball stud having its spherical portion encircled by the spherical bearing surface under a pre-loaded condition. It is necessary that the bearing surface of the bearing for the ball joint of the type referred to above precisely contact the spherical portion of the ball stud under a pressure, (for example, over 75% of the contact ratio with respect to a standard surface) and the bearing surface has a mirror finish. Such a bearing has been conventionally produced by either injection molding or compression molding. However, as is well known in the art, when such a bearing is produced by injection molding, even if a core form which has been suitably designed based on the calculation of anticipated thermal shrinkage of plastic material of the bearing with respect to standard dimensions of the bearing product is employed, it is very difficult to injection-mold the bearing to its prescribed precise dimensions due to thermal deformation and partial shrinkage of the bearing material. Therefore, a core form to be employed in the injection molding of such a bearing has been conventionally produced by preliminarily making a core form from a blank, injection-molding a bearing employing such a core form, inspecting the molded bearing for any defect or irregularity of the core form and if any, correcting or eliminating the defect or irregularity based on the result of the inspection and then molding a bearing employing the corrected core form. The inspection, correction and remolding procedures are repeated until a desired bearing with the specifications can be molded.

Therefore, a core form of the above type can not be satisfactorily employed in the injection molding of the bearing even if the core form has been formed with a perfectly circular configuration and the core form has to be often modified after a series of bearings have been molded employing such a core form which has been repeatedly modified during the entire molding operation. Thus, a core form which is to be employed in the injection molding of a bearing is required to have not only a truly circular configuration, but also a precisely dimensioned spherical surface.

I previously proposed a bearing as disclosed in the copending laid-open Japanese Patent Application Publication No. 72551/1973 and such a bearing is shown in FIGS. 1 and 2 of the accompanying drawings for reference. The bearing 12 is provided in its inner or bearing surface 26 with a plurality of circular isolated oil retention recesses 25 for holding lubricant oil therein whereby the bearing can always provide a uniform and smooth rotation torque and exhibit a satisfactory impact absorbing property and also eliminate the necessity for oil replenishment. In order to produce such a bearing, it is necessary that the outer periphery of the core form to be employed in the injection molding of the bearing to provided with a plurality of reliefs adapted to form the oil retention recesses in the bearing. It is very difficult to produce such a core form by the conventional metal core form production method which requires cutting and grinding steps.

One conventional method for producing a tool steel core form will be now described referring to FIG. 2 of the accompanying drawings. According to this conventional method, first of all, a spherical core blank having the radius of curvature corresponding to the radius of curvature $R_2$ of an imaginary circle described by the bottoms of oil retention recesses 25 to be formed in a bearing 12 is formed; then an acid resisting material is applied onto the outer periphery of the spherical portion of the core blank at locations corresponding to the locations of the oil retention recesses to be formed in the inner or bearing surface of the bearing (the so-called masking) and finally, the rest of the outer periphery of the spherical portion of the core blank other than the acid-resisting material applied or masked area is subjected to acid or electrolytic corrosion so as to produce a bearing molding core form having a spherical portion of the radius of curvature which corresponds to the radius of curvature $R_1$ of the inner or bearing surface 26 of the bearing 12. However, a bearing formed by the use of the core form produced from such a method very often fails to have the bearing or inner surface 26 having precise dimensions because of the reasons referred to above. According to another conventional method for producing a bearing molding core form, a core form blank is first precisely processed to a true spherical shape so as to correspond to the radius of curvature $R_1$ of the bearing surface 26; then holes are drilled in the outer periphery of the spherical portion of the core form blank in locations corresponding to those of oil retention recesses 25 to be formed in the bearing 12 which will be formed by the use of the core form and finally, steel pins having a suitable size to be snugly fitted in the holes are driven into the drilled holes to provide projections for producing the oil retention recesses 25. When a bearing is injection-molded by the use of the thus formed core form, the material for the bearing is injected about the core form to thereby form oil retention recesses 25 in the bearing or inner surface of the bearing while the bearing is being molded. However, the bearing molding core form produced by the method referred to just above usually does not have sufficient strength and also it has disadvantages that the pins can not be easily and precisely fitted in the drilled holes; further, it requires a rather long processing time resulting in high production cost.

SUMMARY OF THE INVENTION

Therefore, one object of the present invention is to provide a method for producing a core form suitable to be employed in the injection molding of a ball joint bearing which can effectively eliminate the disadvantages inherent in the conventional core form production methods referred to above.

Another object of the present invention is to provide a method for producing a core form suitable to be employed in the injection molding of a ball joint bearing at less expense.

Another object of the present invention is to provide a method for producing a core form suitable to be employed in the injection molding of a ball joint bearing eliminating the necessity for repeated inspection and correction of the core form.

A further object of the present invention is to provide a method for producing the above-mentioned type core form by a simple and economical process.

According to the present invention, a method is provided for producing a synthetic resin or rubber ball joint bearing which has a spherical bearing surface adapted to encircle the ball of a ball joint resiliently and a plurality of isolated oil retention recesses formed in said bearing surface, which method comprises the steps of forming a spherical portion corresponding to said bearing surface of the bearing on a core form blank, applying a lead layer onto said spherical portion, removing said lead layer from selected areas of said spherical portion which correspond to said oil retention recesses in the spherical bearing surface of the bearing to expose the selected areas, applying a hard chrome plating layer at said exposed areas to form reliefs which are adapted to form said oil retention recesses in the bearing surface and removing the remaining portion of said lead layer from the spherical portion.

The above and other objects and attendant advantages of the present invention will be more apparent to those skilled in the art from a reading of the following detailed description in conjunction with the accompanying drawings which show one preferred embodiment of the invention for illustration purpose only, but not for limiting the scope thereof in any way.

BRIEF DESCRIPTION OF THE DRAWINGS

FIG. 4a is a fragmentary cross-sectional view on an enlarged scale of a core form constructed in accordance with the method of the invention;

FIG. 4b is a fragmentary perspective view on an enlarged scale of said core form as shown in FIG. 4a.

Figure 1:
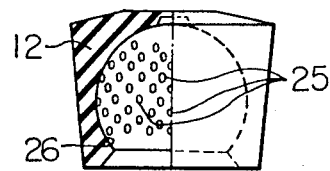
FIG. 1 is an elevational view in partial section of a bearing molded by the use of a core form constructed in accordance with the method of the invention.
Figure 2:
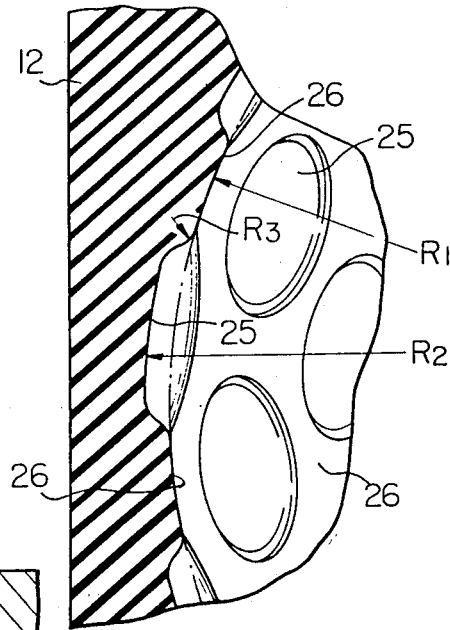
FIG. 2 is a fragmentary cross-sectional view on an enlarged scale of said bearing as shown in FIG.1.
Figure 3:
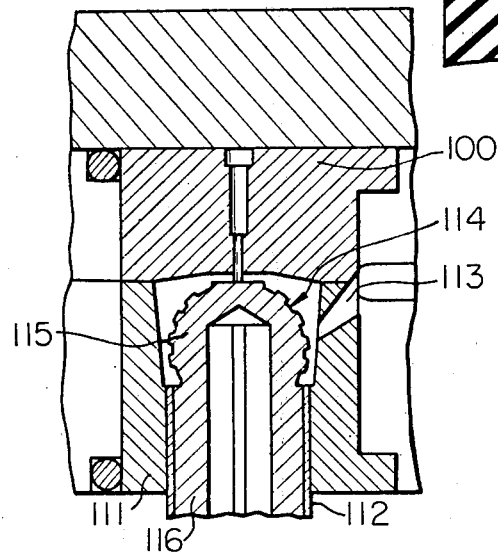
FIG. 3 is a fragmentary cross-sectional view of a bearing injection molding machine which molds bearings by the use of a core form constructed in accordance with the method of the invention.
Figure 4:
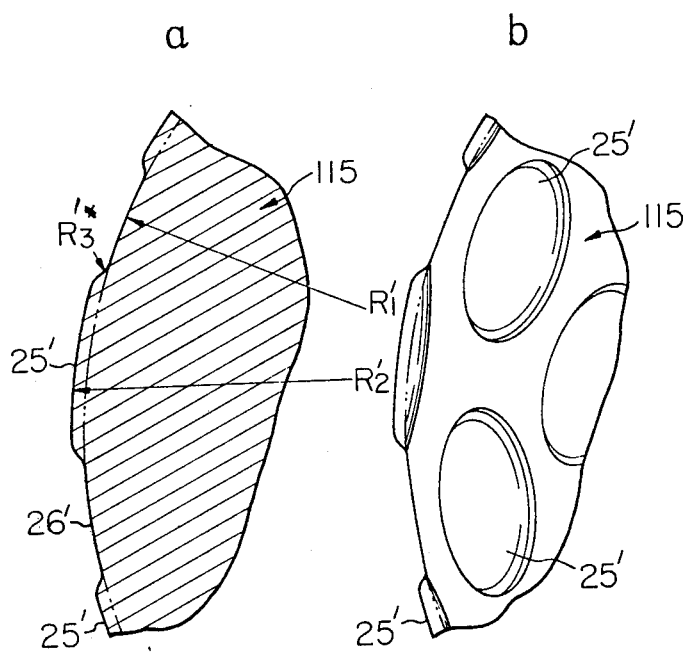

PREFERRED EMBODIMENT OF THE INVENTION:

The present invention will be now described referring to the accompanying drawings which show one preferred embodiment of the invention and more particularly, to FIG. 3 in which an injection molding machine suitable to be employed in carrying out the method of the invention is partially shown. In FIG. 3, cooperating upper and lower dies are shown by reference numerals 100 and 111, respectively and a knockout member 112 is disposed within the lower die 111. A core form 114 processed by the method of the present invention is mounted within the lower die 111 by means of the knockout member 112. The core form 114 includes a spherical portion 115 adapted to form the inner or bearing surface 26 of a bearing to be formed by the core form and the integral shank 116 extending downwardly from the spherical portion 115. Referring to FIGS. 4a and 4b, a portion of the spherical portion 115 of the core form 114 is more clearly shown in cross-section. In these Figures, character and numeral references $R'_1$, $R'_2$, 25' and 26' denote those corresponding to those of the bearing 12 as shown by characters and numeral references $R_1$, $R_2$, 25 and 26 in FIG. 2, respectively and those of the core form have been presicely processed to the dimensions of the corresponding ones of the bearing to be produced. The radius of curvature $R'_1$ of the spherical portion 115 may vary through the entire spherical surface of the spherical portion within the tolerance range of ± several microns to several ten microns.

In the production of the core form, as a first stage in the production operation, a tool steel material is mechanically processed to a core form blank, the blank is heat-treated, the heat-treated blank is further subjected to mechanical processing to provide the spherical portion 115 having a radius curvature of $R'_1$ and the shank 116, respectively. In the secondary mechanical processing stage, for example, the spherical portion 115 is formed so as to have the radius of curvature $R'_1$ slightly greater than the radius $R_1$ of the bearing 12 anticipating the possible shrinkage of the material for the bearing which is in most cases plastic material. As a second stage in the production of the core form, the core form is placed in the injection molding machine and the bearing material is injected onto the core form to mold a bearing product thereon. After the molding of the bearing, the dimensions of the produced bearing are inspected. The inspection is carried out by detecting the contact condition between the core form and bearing by the conventional blueing means employing a model tool under the same conditions as those under which the bearing is practically employed. When any improper contact condition is detected, an area of the spherical portion 115 of the core form which shows the improper contact condition is further processed to correct the improper contact 39 is 41 processed 43 correct 45 improper contact condition. This inspection is a very important step in the production of the core form and the blueing contact condition inspection and finish steps on the core form spherical portion are carefully repeated until the bearing will come to portion is finished preciseness. After the finishing step, the core form is usually subjected to the conventional tufftriding treatment to impart the core form wear resisting property.

As a third stage in the production of the core form, a thin lead sheet is applied over the entire core form by means of a non-drying adhesive (that is, the so-called non-plating masking step is carried out). In this way, a lead layer 117 having a uniform thickness is formed on the entire surface of at least the spherical portion 115 (see FIG. 5). In this third stage, the adhesive-applied lead tape manufactured and sold under the trade name "SCOTCH BRAND TAPES" by Minnesota Mining & Manufacturing Co. can be conveniently employed.

Figure 5:
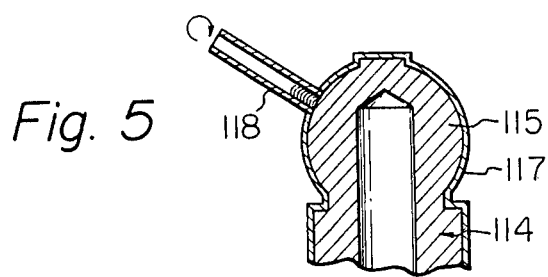
FIG. 5 is an explanatory view showing the lead layer removal step in the bearing molding operation by the use of a core form constructed in accordance with the present invention.

This lead layer has high elongation and can easily and completely cover the spherical portion of a complicated configuration. As a fourth stage in the production of the core form, a portion of the lead layer on the spherical portion 115 of the core form is removed with a suitable tool from areas which correspond to the positions of the core form reliefs 25' by which the recesses 25 are to be formed in a bearing in a fifth stage in the core form production operation as will be described hereinafter. The lead layer removal is carried out in the following manner, that is, a tubular tool 118 having the same diameter as the reliefs 25' to be formed in the core form spherical portion in the next stage and the cutting edge at the tip or inner end is abutted against the outer periphery of the spherical portion of the core form at each point where the relief 25' is to be formed as shown in FIG. 5 while rotating the tube to thereby cut away the lead layer at such an area. Scraps of the lead layer generated in the cutting operation enter into the interior of the tool 118 so that the cutting operation will not be obstructed. In this way, the lead layer is easily removed from the areas of the spherical portion where the reliefs 25' are to be formed and thus the partial removal operation of the lead layer can be easily performed. As a fifth stage in the production of the core form, the core form with part of the lead layer removed therefrom is prepared for plating and then plated with a layer of hard chrome. In the chrome plating stage, all of the outer periphery of the spherical portion is plated with a hard chrome layer until the thickness of the layer reaches a predetermined or suitable value (about 30 microns in the illustrated embodiment). As a sixth or last stage in the production of the core form production operation, the remaining lead layer or masking is removed from the rest of the spherical portion outer surface other than the chrome plated areas to thereby leave the chrome plated areas as the reliefs 25' which serve to form the oil retention recesses 25 in a bearing to be molded by the use of the thus produced core form. The removal of the remaining lead in the layer can be effected by either heating the core form to the melting point of lead or scraping the remaining lead off. In this way, the core form production operation is completed.

By the method for producing a core form which is employed for molding a ball joint bearing according to the present invention, core forms having any complicated configurations and various dimensions can be precisely produced.

In the core form produced by the method of the invention described above, the surface 26' of the spherical portion which acts to form the inner or bearing surface 26 of a bearing to be molded becomes a hardened mirror finish surface which has been subjected to the tufftriding and similarly, the reliefs 25' which act to form the oil retention recesses 25 in the bearing to be molded have a semipermanent service life as a form for molding plastic materials because the reliefs are coated with the hard chrome layer. And since the adhesive layer is present between the lead layer and the surface of the spherical portion, the plating layer extends in the interface between the lead layer and spherical portion surface. Therefore, each of the reliefs 25' has the rounded outer edge $R'_3$ (see FIG. 4) which corresponds to the rounded outer edge $R_3$ of each of the oil retention recesses 25 of the bearing to be molded (see FIG. 2) whereby the bearing can be easily separated from the core form after the molding of the bearing.

From the foregoing description of the preferred embodiment of the method according to the present invention, it will be appreciated that a core form which is required to be precise in dimensions can be easily produced at less expense. It will be also appreciated that the core form produced by the method of the invention is suitable to be employed in the injection molding of bearings having oil retention recesses of precise dimensions on a mass production scale and has a long service life.

While only one embodiment of the invention has been shown and described in detail, it will be understood that the same is for illustration purpose only and not to be taken as a definition of the invention, reference being had for the purpose to the appended claims.

What is claimed is:

1. A method for producing a core form to be employed in the molding of a synthetic resin or rubber ball joint bearing which has a spherical bearing surface adapted to encircle the ball of a ball joint resiliently and a plurality of isolated oil retention recesses formed in said bearing surface, comprising the steps of forming and finishing a spherical portion corresponding to said bearing surface of the bearing on a core form blank, applying a lead layer onto said spherical portion, removing said lead layer from selected areas of said spherical portion which correspond to said oil retention recesses to be formed in the bearing surface of the bearing to expose said selected areas, applying a hard chrome plating layer on said exposed areas to form reliefs which are adapted to form said oil retention recesses in the bearing and removing the remaining portion of said lead layer from the spherical portion.

2. The method as set forth in claim 1, wherein the spherical lead sheet is applied on the entire surface of at least the spherical portion by to have a radius of curvature slightly greater than the radius of the bearing surface of the bearing to be produced, and then is subjected to tufftriding treatment to impart wear resisting property.

3. The method as set forth in claim 1, wherein a thin lead sheet is applied on the entire surface of at least one spherical portion by a non-drying adhesive to provide the lead layer.

4. The method as set forth in claim 1, wherein the lead layer on the spherical portion is removed from selected areas of the spherical portion which correspond to the oil retention recesses by means of a rotating tubular tool which has the same diameter as reliefs for oil retention recesses to be formed in the bearing surface.

5. The method as set forth in claim 1, wherein the thickness of the hard chrome layer is about 30 microns.

* * * * *